United States Patent
Baker et al.

(10) Patent No.: US 6,526,394 B2
(45) Date of Patent: Feb. 25, 2003

(54) ACCURATE TARGET DETECTION SYSTEM

(75) Inventors: Todd L. Baker, Oro Valley, AZ (US); Timothy E. Caber, Tucson, AZ (US); Hien T. Dang, Granada Hills, CA (US); Thomas K. Lo, Oro Valley, AZ (US); Sheldon S. Wald, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/794,545

(22) Filed: Feb. 26, 2001

(65) Prior Publication Data

US 2002/0084414 A1 Jul. 4, 2002

Related U.S. Application Data

(62) Division of application No. 09/190,985, filed on Nov. 12, 1998, now Pat. No. 6,215,115.

(51) Int. Cl.⁷ .......................... G06F 15/18; G06F 17/00; G06F 9/44
(52) U.S. Cl. ................. 706/4; 706/8; 706/50; 706/52
(58) Field of Search ...................... 706/4, 8, 52; 700/50

(56) References Cited

PUBLICATIONS

Reza Langari, "Synthesis of Nonlinear Controllers Via Fuzzy Logic", IEEE International Conference on Fuzzy Systems, 1993.*

* cited by examiner

Primary Examiner—George B. Davis
(74) Attorney, Agent, or Firm—Colin M. Raufer; Leonard A. Alkov; Glenn M. Lenzen, Jr.

(57) ABSTRACT

A fuzzy controller (130) for use in target detection systems. The fuzzy controller (130) includes a first circuit (132) for determining a number of false alarms in a frame of data. A second circuit (136) determines a desired number of false alarms for the frame of data. A third circuit (134–152) computes a threshold multiplier factor based on the number of false alarms, the desired number of false alarms, and one or more fuzzy rules. In a specific embodiment, the first circuit (132) includes a target detection system for providing addresses of pixels whose values are within a predetermined range relative to a detection threshold. The second circuit (136) includes an input device (136) for accepting the desired number of false alarms as input to the fuzzy controller (130). The third circuit (138–152) includes a fuzzifier input calculation circuit (134) that computes a fuzzifier input value based on the number of false alarms detected in a frame and the desired number of false alarms.

11 Claims, 5 Drawing Sheets

ACCURATE TARGET DETECTION SYSTEM

This application is a divisional of application Ser. No. 09/190,985, filed Nov. 12, 1998, U.S. Pat No. 6,215,115.

This invention was made with Government support under Contract No. DASG60-90-0166 awarded by the Department of the Army. Accordingly, the U.S. Government may have certain rights in this invention.

BACKGROUND OF THE INVENTION

1. Field of Invention

This invention relates to controllers. Specifically, the present invention relates to fuzzy controllers used in target detection systems to obtain a desired probability of false alarms.

2. Description of the Related Art

Target detection systems are used in a variety of demanding applications including radar air traffic control systems, missile target tracking systems, and electro-optical target detection systems employed on aircraft and ground-based military vehicles. Such applications often require accurate target detection systems that produce minimal false detections.

A target detection system typically includes an electromagnetic energy sensor that receives electromagnetic signals such as optical signals and outputs electronic signals in response thereto. A processing circuit analyzes the electronic output signals to determine if a target is present in the field of view of the sensor.

The sensor is often a focal plane array of electromagnetic energy detectors such as charge-coupled devices (CCDs). Detectors in the array may have different performance characteristics that may change with a changing signal environment. Often, the detectors are initially calibrated by aiming the sensor at a dark, uniform region of space. Electrical offset values or gain coefficients are applied to the outputs of the detectors to equalize the outputs and thereby compensate for detector signal non-uniformities.

In a typical constant false alarm rate (CFAR) target detection system, the processing circuit includes a detector non-uniformity correction circuit for performing the calibration, a background estimation circuit, and a threshold circuit. The background estimation circuit determines an initial background value that is subtracted from the outputs of the detectors to enhance signal-to-noise ratio. The threshold circuit establishes a detection voltage threshold range for the detectors in the array. Typically, a single threshold range is established for all detectors in the array.

An 'alarm' occurs when the magnitude of a detector output signal is within the threshold range. By controlling the threshold range, the target detection system can control the probability of making a false detection. However, decreasing the probability of false detection may increase the likelihood that a target will go undetected.

Use of a single threshold range for all detectors in the array is inefficient, as the performance capabilities of individual detectors are often not maximized. For example, low performance detectors may raise the desired lower threshold of the threshold range. Due to the higher threshold, the capability of any high performance pixels to detect targets in noisy environments is not utilized.

Detector background estimation is often performed when the target detection system is initially activated and is disabled thereafter. In existing systems, if the background estimation circuit remains enabled, target information may corrupt the background estimates. The corrupted values may greatly reduce the target detection capability of the system. Accordingly, many existing target detection systems fail to account for variations in background that often occur during system operation. As a result, the ability of such target detection systems to accurately detect targets is compromised.

Hence, a need exists in the art for an accurate target detection system that accounts for varying detector background levels and changing signal environments during system operation.

SUMMARY OF THE INVENTION

The need in the art is addressed by the accurate target detection system of the present invention. In the illustrative embodiment, the inventive system is adapted for use with electro-optical systems and includes a first circuit for receiving electromagnetic signals and providing electrical signals in response thereto. A second circuit corrects background non-uniformities and/or noise in the first circuit based on the electrical signals and provides calibrated electrical signals in response thereto. A third circuit determines if a target signal is present within the calibrated electrical signals and provides a target detection signal in response thereto. A fourth circuit selectively activates or deactivates the second circuit based on the target detection signal.

In a specific embodiment, the first circuit is an array of electromagnetic energy detectors, each detector providing an electrical detector output signal. The second circuit includes a non-uniformity correction circuit for compensating for gain non-uniformities and noise non-uniformities in the electromagnetic energy detectors. The second circuit includes a detector gain term memory for storing detector gain compensation values. The detector gain compensation values are normalized by noise estimates unique to each of the detectors. The third circuit includes a signal enhancement circuit for increasing the signal-to-noise ratio of the calibrated electrical signals. The third circuit includes a noise estimation circuit for estimating noise in each of the detector output signals and providing noise estimates in response thereto. The noise estimation circuit further includes a noise estimator and a recursive background estimator. The third circuit further includes a subtractor for subtracting background contained in the noise estimates from the calibrated electrical signals and providing background subtracted signals in response thereto. The signal enhancement circuit includes a frame integrator circuit for summing frames of image data and providing summed frames in response thereto. Each frame of image data contains data corresponding to the background subtracted signals. The signal enhancement circuit further includes a filter bank that enhances the signal-to-noise ratio of the summed frames and provides a filtered signal in response thereto. The third circuit includes a first threshold circuit for comparing the filtered signal to a first threshold and a second threshold and providing a threshold exceedance signal if the filtered signal is between the first threshold and the second threshold.

In the illustrative embodiment, the third circuit further includes a digital signal processor running a fuzzy controller that acilitates the determination of the first threshold by providing a threshold multiplier value The first threshold is a function of the threshold multiplier and noise variables for the background subtracted signals. The noise variables include a mean noise offset, noise variance estimates from the background subtracted signals, and a noise statistic for accounting for moments greater than two in noise statistics of the background subtracted signals. The fourth circuit includes a second threshold circuit for comparing the background subtracted signals to a target detection threshold and providing the target detection signal in response thereto when the background subtracted signals exceed the target detection threshold. The target detection signal acts as an inhibit signal and is input to background and noise estimation circuits to disable the estimation circuits when the target signal is possibly present with in the background subtracted signals. The first threshold is a function of the noise variance estimates and a second threshold multiplier.

The novel design of the present invention is facilitated by use of the second threshold circuit to selectively inhibit background updates and noise estimation calculations for the outputs of detectors of the sensor that possibly represent target data. As a result, background estimation functions and noise estimation functions may continue to run during operation of the target detection system of the present invention. This allows the target detection system of the present invention to track any changes in signal environment and detector noise performance during system operation This greatly increases the ability of the target detection system of the present invention to detect targets in noisy environments. Furthermore, use of threshold levels unique to each detector in the second threshold circuit and the first threshold circuit allows the present invention to optimize the target detection capabilities of each detector in the sensor.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
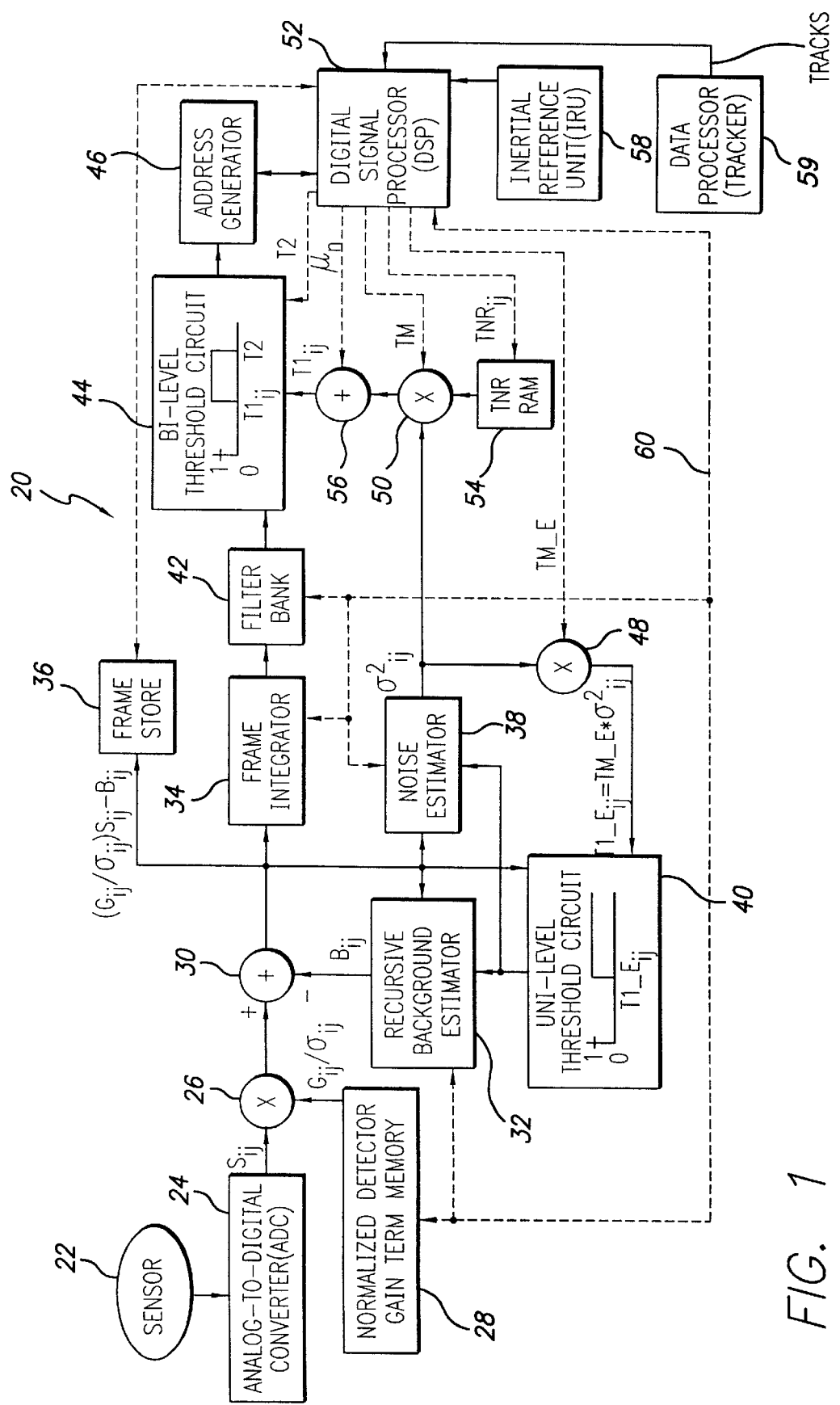
FIG. 1 is a diagram of a target detection system constructed in accordance with the teachings of the present invention

FIG. 1 is a diagram of a target detection system 20 constructed in accordance with the teachings of the present invention. The target detection system 20 includes a sensor 22, the output of which is connected to a analog-to-digital convener (ADC) 24. An output of the ADC 24 is connected to a first input of a first multiplier 26. A second input of the first multiplier 26 is connected to an output of a normalized detector gain term memory 28. An output of the first multiplier 26 is connected to a positive terminal of a subtractor 30. A negative terminal of the subtractor 30 is connected to an output of a recursive background estimator 32. An output of the subtractor 30 is connected, in parallel, to an input of a frame integrator 34, a frame store 36, a noise estimator 38, the recursive background estimator 32, and a uni-level threshold circuit 40. An output of the uni-level threshold circuit 40 is connected, in parallel, to an input of the recursive background estimator 32 and an input of the noise estimator 38. An output of the frame integrator 34 is connected to a filter bank 42. An output of the filter bank 42 is connected to an input of a bi-level threshold circuit 44, an output of which is connected to an address generator 46. An output of the noise estimator 38 is connected, in parallel, to an input of a second multiplier 48 and a first input of a third multiplier 50. Another input of the second multiplier 48 is connected to a digital signal processor (DSP) 52. An output of the second multiplier 48 is input to the uni-level threshold circuit 40. A second input of the third multiplier 50 is connected to an output of a TNR random access memory (TNR RAM) 54. A third input of the third multiplier is connected to the DSP 52. An input of the TNR RAM 54 is also connected to the DSP 52. An output of the third multiplier 50 is connected to an input of an adder 56. Another input of the first adder 56 is connected to the DSP 52. An output of the adder 56 is input to the bi-level threshold circuit 44. The bi-level threshold circuit 44 also receives additional input from the DSP 52. The DSP 52 is also connected to the normalized detector gain term memory 28, the recursive background estimator 32, the frame integrator 34, the noise estimator 38, and the filter bank 42 via a bus connection 60. An inertial reference unit 58 provides input to the DSP 52.

In the present specific embodiment, the sensor 22 is a focal plane array of electro-optical detectors such as charge-coupled devices. Each detector provides an output signal corresponding to a pixel in a frame of image data Each frame of image data represents output signals from each of the detectors during a predetermined time interval. The predetermined time interval is based upon a system frame rate. The system frame rate may vary in accordance with requirements for a particular application and is easily implemented via clocks, timers, and synchronizing circuits by those ordinarily skilled in the art.

In operation, the sensor 22 receives electromagnetic energy within a field of view of the sensor 22 and converts the electromagnetic energy into an analog electrical signal that is transferred to the ADC 24. The ADC 24 converts the analog electrical signal into a digital signal $S_{ij}$. The digital signal $S_{ij}$ represents the digitized outputs of detectors in the sensor 22 when the sensor 22 is an array of detectors having i rows and j columns. The digital signal $S_{ij}$ is input to the first multiplier 26, which is a digital multiplier The normalized detector gain term memory 28 has i times j memory locations, one location for each detector in the sensor 22. Each memory location stores correction terms $G_{ij}/\sigma_{ij}$ for each ij detector in the sensor 22. The correction terms $G_{ij}/\sigma_{ij}$ are a ratio of gain non-uniformity correction terms $G_{ij}$ and noise terms $\sigma_{ij}$. The $G_{ij}$ terms are initially determined in a laboratory environment and are specific to each detector in the sensor 22. The noise terms air are updated during system operation via the DSP 52. The DSP 52 runs software that reads noise variance terms $\sigma_{ij}^2$ from the noise estimator 38, computes the square root of the noise variance terms $\sigma_{ij}^2$, and provides the resulting noise estimates to the normalized detector gain term memory 28 via the buss connection 60. The noise variance terms $\sigma_{ij}^2$ are continually updated during operation of the target detection system 20 when not inhibited from doing so by an inhibit signal from the uni-level threshold circuit 40.

Those skilled in the art will appreciate that updating of the noise terms $\sigma_{ij}$ may be implemented in hardware and may be computed without first computing the noise variance terms $\sigma_{ij}^2$ without departing from the scope of the present invention.

The correction terms $G_{ij}/\sigma_{ij}$ from the normalized detector gain term memory 28 are multiplied with digital signal $S_{ij}$ via the first multiplier 26. The first multiplier 26 outputs a calibrated signal comprising $S_{ij}(G_{ij}/\sigma_{ij})$ terms to the positive terminal of the subtractor 30 Initially, the negative terminal of the subtractor 30 is zero, and the calibrated signal $S_{ij}(G_{ij}/\sigma_{ij})$ initializes the frame store 36, the uni-level threshold circuit 40, the noise estimator 38, and the recursive background estimator 32.

Those skilled in the art will appreciate that the recursive background estimator 32, the noise estimator 38, the frame integrator 34, and the frame store 36 may be pre-initialized via software running on the DSP 52 without departing from the scope of the present invention.

Once initialized, the recursive background estimator 32 provides background estimates $B_{ij}$ to the negative terminal of the subtractor 30. Initially, the background estimates $B_{ij}$ are based on the background in the calibrated signal $S_{ij}(G_{ij}/\sigma_{ij})$ and thereafter are based on an average of past frames of image data representing an accumulation of $S_{ij}(G_{ij}/\sigma_{ij})-B_{ij}$ terms from the output of the subtractor 30. The number of frames to be averaged by the recursive background estimator 32 is controllable via software running on the DSP 52. The software is easily constructed by those ordinarily skilled in the art. In addition, the normalized detector gain term memory 28 is easily constructed by those ordinarily skilled in the art and may be implemented in random access memory (RAM) or electrically ereasable programmable read only memory (EEPROM).

Unlike many conventional target detection systems that only account for detector gain non-uniformities, the present invention accounts for noise non-uniformities via the application of the correction terms $G_{ij}/\sigma_{ij}$.

The $S_{ij}(G_{ij}/\sigma_{ij})-B_{ij}$ terms output from the subtractor 30 represent background subtracted video that comprises frames of image data. The noise estimator 38 computes noise estimates $\sigma_{ij}^2$ based on the background-subtracted video $S_{ij}(G_{ij}/\sigma_{ij})-B_{ij}$ and inputs the estimates $\sigma_{ij}^2$ to the second multiplier 48. The noise estimates $\sigma_{ij}^2$ are multiplied with a predetermined threshold multiplier TM_E provided via the DSP 52.

The threshold multiplier TM_E may be computed via the use of a fuzzy controller as discussed more thoroughly below, or via another mechanism without departing from the scope of the present invention The output TM_E*$\sigma_{ij}^2$ of the second multiplier 48 represents a threshold level of the uni-level threshold circuit 40 The threshold multiplier TM_E is set so that when the output TM_E*$\sigma_{ij}^2$ term is less than the signed square of the corresponding background subtracted video term $S_{ij}(G_{ij}/\sigma_{ij})-B_{ij}$, the ij detector in the sensor 22 is likely receiving input electromagnetic energy representative of a target.

The uni-level threshold circuit 40 compares the signed square of the background subtracted video $S_{ij}(G_{ij}/\sigma_{ij})-B_{ij}$, i.e., $(S_{ij}(G_{ij}/\sigma_{ij})-B_{ij})^2$ with the lower threshold. If the signed square of the background subtracted video $S_{ij}(G_{ij}/\sigma_{ij})-B_{ij}$ exceeds the lower threshold, then the signal output from the ij detector in the sensor 22 may represent target data or other data that is not desirable to include in noise estimates. The uni-level threshold circuit 40 then outputs an inhibit signal in response thereto to the recursive background estimator 32 and the noise estimator 38. The inhibit signal disables the recursive background estimator 32 and the noise estimator 38 thereby preventing target data or spike data output from a given detector from corrupting the background estimates $B_{ij}$ and the noise estimates $\sigma_{ij}^2$, respectively.

By selectively inhibiting the updating of the background estimates $B_{ij}$ and the noise estimates $\sigma_{ij}^2$ in response to the reception of possible target data by a given detector in the sensor 22, the target detection system 20 of the present invention may account for changes in signal environment and detector performance during system operation. This greatly enhances the performance of the target detection system 20. Conventional target detection systems must often refrain from computing background estimates and noise estimates during system operation due to the fact that target data will otherwise corrupt the estimates.

Those skilled in the art will appreciate that the computations performed in the modules such as the noise estimator 38 and the uni-level threshold device may be based on averages or accumulations of frames of image data without departing from the scope of the present invention.

To further enhance the target detection capability of the target detection system 20, the frame integrator 34 and the filter bank 42 are employed to increase the signal-to-noise ratio (SNR) of the background subtracted video $S_{ij}(G_{ij}/\sigma_{ij})-B_{ij}$. The frame integrator 34 adds a predetermined number of frames of background subtracted video $S_{ij}(G_{ij}/\sigma_{ij})-B_{ij}$, which is three in the present specific embodiment. Signal information in the background subtracted video adds coherently while noise adds non-coherently due to the statistical characteristics of the signal and noise, respectively. As a result, when frames of the background-subtracted video are summed, the SNR is enhanced. The output of the frame integrator 34 has zero mean.

To account for motion of the target detection system 20 between frames, the background subtracted video $S_{ij}(G_{ij}/\sigma_{ij})-B_{ij}$ may be re-registered via horizontal or vertical frame shift commands computed by software running on the DSP 52 via input from the inertial reference unit 58. The shift commands are determined via software easily constructed by those ordinarily skilled in the art.

The filter bank 42 is a bank of finite impulse response (FIR) filters (as discussed more fully below). The filter bank 42 filters output from the frame integrator 34 and selects the maximum value output from each of four matched filters. The maximum value is input to the bi-level threshold circuit 44 where its signed square is compared to a threshold range having an upper threshold and a lower threshold.

The lower threshold is computed via the adder 56 and the third multiplier 50 with inputs from the TNR RAM 54, the noise estimator 38, and the DSP 52. The third multiplier receives TNR values $TNR_{ij}$ from the TNR RAM 54 that stores $TNR_{ij}$ values computed by software running on the DSP 52. The TNRij values compensate for higher order moments, i.e., moments greater than two in the noise statistic $\sigma_{ij}$. For example, if the statistical noise distribution for a given detector in the sensor 22 is not Gaussian, the $TNR_{ij}$ values may be applied to compensate for the statistical abnormality. Also, the TNR values $TNR_{ij}$ may be used to disable malfunctioning detectors.

The third multiplier 50 also receives a threshold multiplier TM input from the DSP 52. A fuzzy controller, (as discussed more fully below) implemented in software running on the DSP 52, computes the threshold multiplier TM based on a desired number of false alarms per frame of data received from the sensor 22 and based on the actual number of alarms detected by the DSP 52 via input from the address generator 46 and based on the number of true track detections from a data processor 59. Inputs (not shown) to the data processor 59 and the construction of the data processor 59 are well known by those ordinarily skilled in the art.

Those skilled in the art will appreciate that another type of controller other than a fuzzy controller may be used without departing from the scope of the present invention.

The third multiplier 50 multiplies the noise estimates $\sigma_{ij}^2$ from the noise estimator 38, TNR values $TNR_{ij}$, and threshold multiplier TM and provides the resulting output $\sigma_{ij}^2 * TNR_{ij} * TM$ to an input of the adder 56. The adder 56 adds the resulting output $\sigma_{ij}^2 * TNP_{ij} * TM$ to an offset $\mu_n$, which is a software controllable scale factor that provides additional control over the performance of the target detection system 20 and is adjusted according to the requirements of a particular application. The offset $\mu_n$ is global to all detectors in the array. The resulting sum $\sigma_{ij}^2 * TNR_{ij} * TM + \mu_n$ represents the lower threshold value $T1_{ij}$, which is unique to each detector in the sensor 22.

Unlike many existing target detection systems, the present invention provides thresholds unique to each detector in the sensor 22 so that the target detection system 20 can maximize the use of the performance capabilities of each individual detector. The capabilities of higher performing detectors are not compromised due to unnecessarily high threshold levels applied to the higher performing pixels due to the application of a single threshold based on global detector statistics.

The upper threshold T2 of the bi-level threshold circuit 44 is software controllable and is adjusted in accordance with the performance requirements for a particular application and is intended to account for gamma spike events and other non-target events that might cause an exceedance of the lower threshold $T1_{ij}$ by the output of the filter bank 42.

The bi-level threshold circuit 44 compares the signed square of the output of the filter bank 42 to the threshold range. If the signed square of the output of the filter bank 42 exceeds the lower threshold $T1_{ij}$ and is less than the upper threshold T2, a detection or 'alarm' is indicated for the ij detector via a pulse (such as a 0 or 1) at the output of the bi-level threshold circuit 44. The address generator 46 receives the output of the bi-level threshold circuit 44, and provides the addresses of the detectors associated with the alarms, i.e., provides the values of i and j to the DSP 52.

The frame store 36 stores the most current background subtracted video values $S_{ij}(G_{ij}/\sigma_{ij}) - B_{ij}$. The DSP 52 can use the address of the detectors at which alarms have occurred to retrieve associated detector output values from the frame store 36. The associated detector output values are utilized by target detection software running on the DSP 52. The target detection software may be developed by those ordinarily skilled in the art.

Various signal delays resulting from computations performed in various circuits such as the noise estimator 38, the recursive background estimator 32, and the subtractor 30 are accounted for via the application of clocking circuits and delays (not shown) which are easily designed and implemented by those ordinarily skilled in the art.

Figure 2:
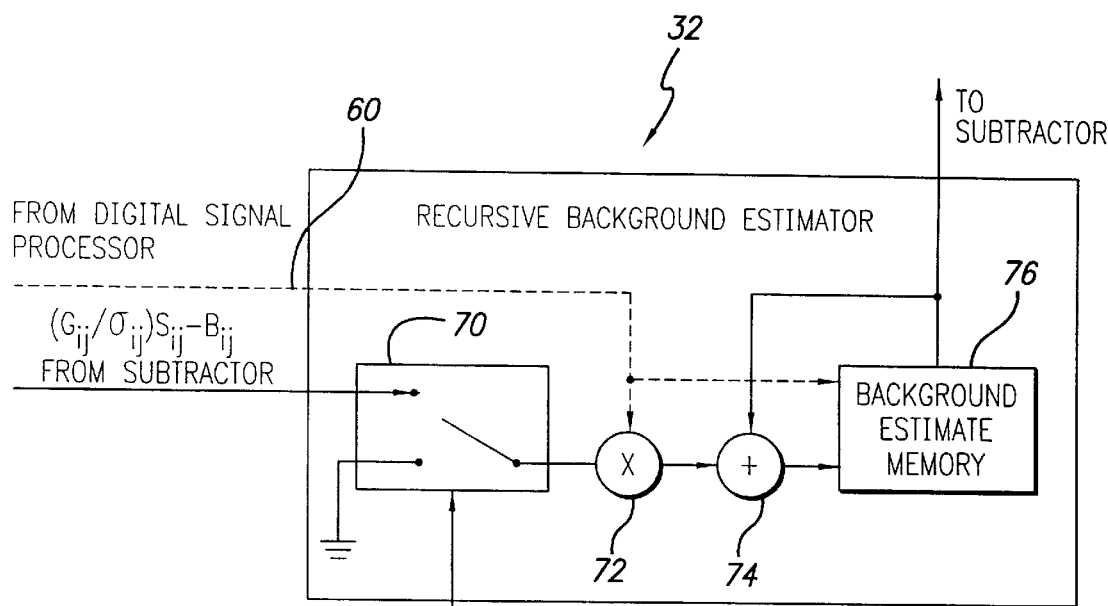
FIG. 2 is a diagram of the recursive background estimator of the target detection system of FIG. 1.

FIG. 2 is a diagram of the recursive background estimator 32 of the target detection system 20 of FIG. 1. The recursive background estimator 32 includes, from left to right, an electrically controllable switch 70, a background estimator multiplier 72, a background estimator adder 74, and a background estimate memory 76. The output of the switch 70 is connected to an input of the background estimator multiplier 72. Another input of the background estimator multiplier 72 is connected to the DSP 52 of FIG. 1 via the bus connection 60 and provides a time constant to the recursive background estimator 32. The bus connection 60 also provides a software read and write connection background estimate memory 76. An output of background estimator multiplier 72 is connected to an input of the background estimator adder 74. Another input of the background estimator adder 74 is connected to an output of the background estimate memory 76, which also represents the output of the recursive background estimator 32. The output of the background estimator adder 74 is input to the background estimate memory 76.

The electrically controllable switch 70 switches its output from the background subtracted video $S_{ij}(G_{ij}/\sigma_{ij}) - B_{ij}$ to a ground connection in response to an inhibit signal from the uni-level threshold circuit 40 of FIG. 1. Those skilled in the art will appreciate that the electrically controllable switch 70 may be implemented as a 2 to 1 multiplexer. The inhibit signal thereby deactivates the recursive background estimator 32 when the uni-level threshold circuit of FIG. 1 detects an exceedance of the corresponding lower threshold $T1\_E_{ij}$.

The DSP 52 has software read and write access to the background estimate memory 76, which is implemented in RAM in the present specific embodiment. The background estimate memory 76 may be implemented via another type of memory such as an electrically erasable programmable read only memory (EEPROM) without departing from the scope of the present invention.

The recursive background estimator 32 provides temporally adaptive mean background estimation localized to each detector of the sensor 22 of FIG. 1. The recursive background estimator 32 is implemented as a digital single pole infinite impulse response (TIR) filter having a filter time constant under software control that is changeable at the frame rate of the sensor 22 of FIG 1.

The recursive background estimator 32 may update continuously, or be inhibited from updating as a result of an inhibit signal provided via the uni-level threshold circuit or via a global software inhibit signal. The global inhibit signal applies to all detectors in the sensor 22 of FIG. 1 and is selectively provided at an input of the background estimator multiplier 72.

With reference to FIGS. 1 and 2, when not globally inhibited from updating, a feedback signal, unique to each detector in the sensor 22, from the uni-level threshold circuit 40, inhibits background updates on detectors that have a threshold exceedance, or are neighbors of detectors which have a threshold exceedance. This feature prevents target data from corrupting the background estimates.

Figure 3:
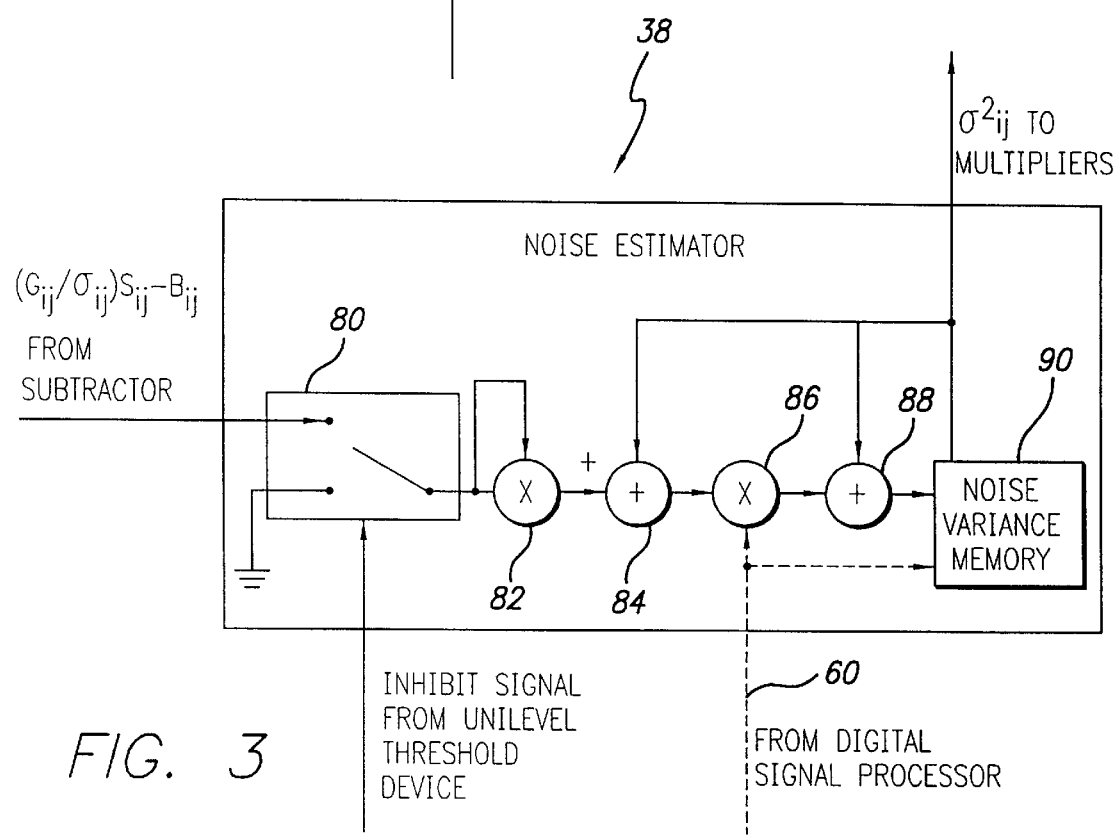
FIG. 3 is a diagram of the noise estimator of the target detection system of FIG. 1.

FIG. 3 is a diagram of the noise estimator 38 of the target detection system 20 of FIG. 1. The noise estimator 38 includes, from left to right, an inhibit switch 80 a first noise estimator multiplier 82, a noise estimator subtractor 84, a second noise estimator multiplier 86, a noise estimator adder 88, and a noise variance memory 90.

The operation of the inhibit switch 80 is similar to the operation of the electrically controllable switch 70 of FIG. 2. The output of the inhibit switch 80 is squared via the first noise estimator multiplier 82 and output to a positive terminal of the noise estimator subtractor 84, the negative terminal of which is connected to an output of the noise variance memory 90, which is similar to the background estimate memory 76 of FIG. 2. An output of the noise estimator subtractor 84 is connected to an input of the second noise estimator multiplier 86, a second input of which is connected to the bus connection 60, which provides a time constant to the multiplier 86 via the bus connection 60 and the DSP 52.

With reference to FIGS. 1 and 3, a signal from the DSP 52 may be used to is globally inhibit noise estimates from being performed on all detectors in the sensor 22. An inhibit signal from the uni-level threshold circuit 40 is input to the inhibit switch 80 and selectively inhibits noise estimates from being computed by the noise estimator 38 for the particular detectors having outputs associated with an exceedance of the threshold of the uni-level threshold circuit 40.

The noise estimator 38 provides noise variance estimation localized to each detector in the sensor 22. The gain-normalized and background-subtracted video $S_{ij}(G_{ij}/\sigma_{ij})-B_{ij}$ is squared and filtered to develop an estimate of the detector noise variance. The noise estimator 38 is a single pole IIR filter with the filter time constant under software control and changeable at the frame rate of the sensor. The noise estimator 38 can be allowed to update continuously at the sensor frame rate, or can be inhibited from updating as a result of a global inhibit signal generated by software and applied via the bus connection 60 and the second noise estimator multiplier 86.

In the present specific embodiment, the noise variance memory 90 is a software read/write RAM and provides read/write access to software functions running on the DSP 52 of FIG. 1 via the bus connection 60. With access to noise variance terms stored in the noise variance memory 90, software functions can compensate the outputs of individual detectors in the sensor 22 for noise non-uniformity. This compensation is accomplished by dividing the gain correction factor by $G_{ij}$ by the square root of the noise variance estimate output from the noise variance memory 90. The gain correction factors divided by the square roots of the noise estimates are stored in the normalized detector gain term memory 28 of FIG. 1.

Figure 4:
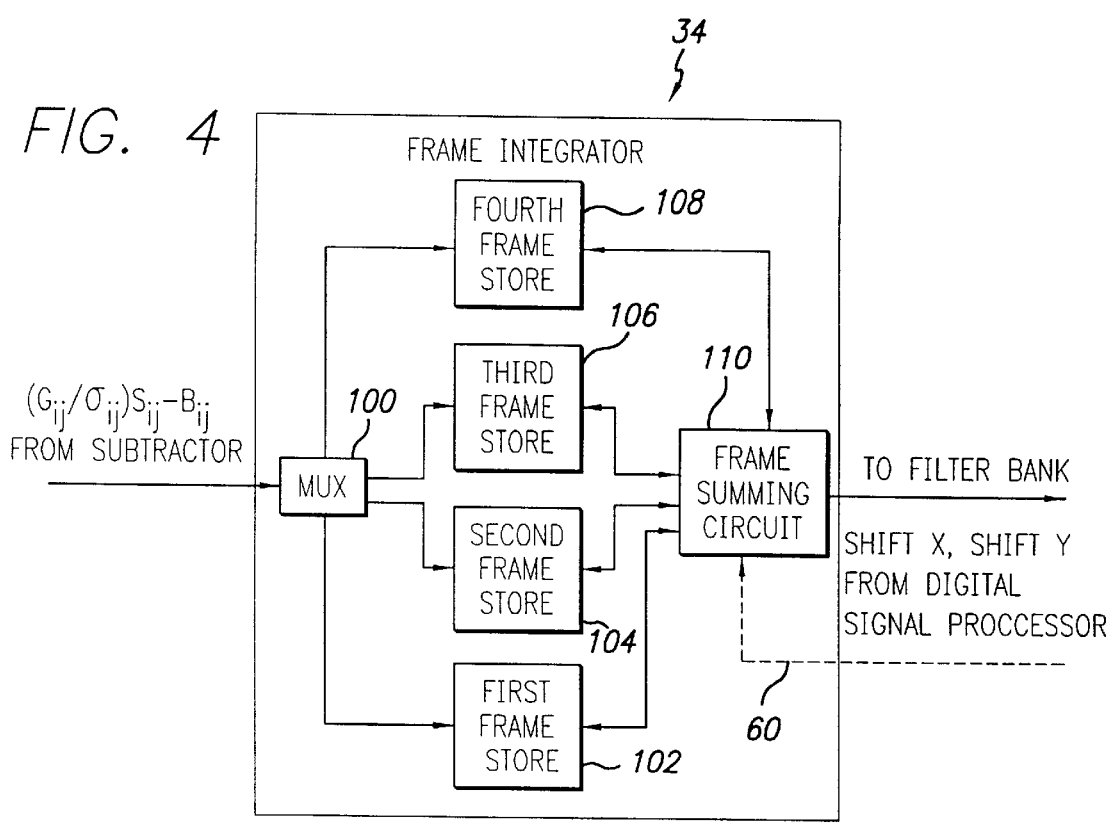
FIG. 4 is a diagram of the frame integrator of the target detection system of FIG. 1.

FIG. 4 is a diagram of the frame integrator 34 of the target detection system 20 of FIG. 1. An input of the frame integrator 34 is provided to an input of a frame integrator multiplexer (MUX) 100. The MUX 100 provides output, in parallel, to a first frame store 102, a second frame store 104, a third frame store 106, and a fourth frame store 108, and stores consecutive frames in adjacent frame stores. The most recent frame of data received by the MUX 100 is stored in the first frame store 102 and the second most recent frame of data is stored in the second frame store 104 and so on. Outputs of the frame stores 102, 104, 106, and 108 are input to a frame summing circuit 110 that selects the three most recent frames of data and adds them. Before summing, the frame summing circuit 110 applies any frame shifts required to spatially register the frames to the nearest pixel, in response to movement of the target detection system 20. In the present discussion, pixels correspond to background subtracted and gain corrected outputs of individual detectors in the sensor 22 of FIG. 1.

With reference to FIGS. 1 and 4, any necessary frame shift signals are provided by the software running on the DSP 52 that takes into account system movement via use of the IRU 58.

The MUX 100, the frame stores 102, 104, 106, and 108, and the frame summing circuit 100 may be easily constructed by those ordinarily skilled in the art. In addition, the frame integrator 34 may be replaced with a different frame integrator, such as one implemented in software, without departing from the scope of the present invention The frame integrator may be selectively bypassed via a bypassing multiplexer (not shown) and a control signal input from the DSP 52 of FIG. 1 to the bypassing multiplexer. The frame integrator 34 may be selectively bypassed in other ways without departing from the scope of the present invention.

Figure 5:
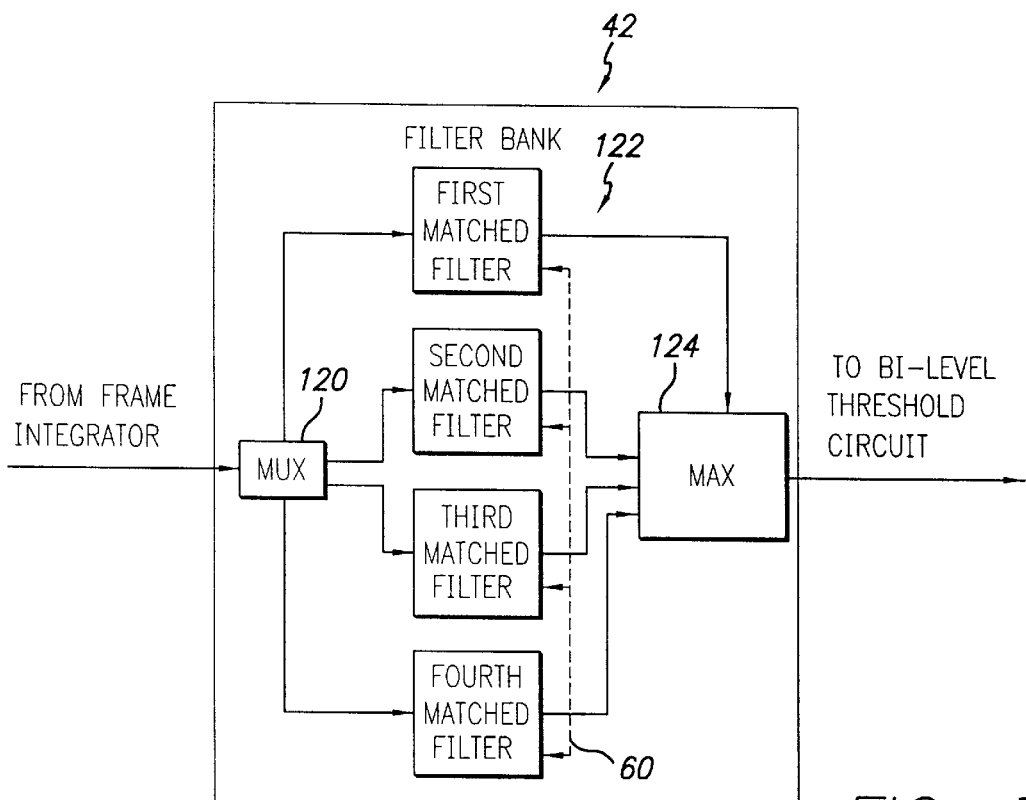
FIG. 5 is a diagram of the matched filter bank of the target detection system of FIG. 1.

FIG. 5 is a diagram of the matched filter bank 42 of the target detection system 20 of FIG. 1. A matched filter bank MUX 120 receives an input of the filter bank 42 corresponding to an output of the frame integrator 34 of FIG. 1. The MUX 42 has four outputs, each of which is connected to one of four matched finite impulse response (FIR) filters 122. A frame of image data is input to different matched filters 122 via the MUX 120. The outputs of the matched filters 122 are connected to a maximization circuit 124 that selects the matched filter output signal having the largest value. The maximum filtered value is output to the bi-level threshold circuit for threshold comparisons.

Figure 6:
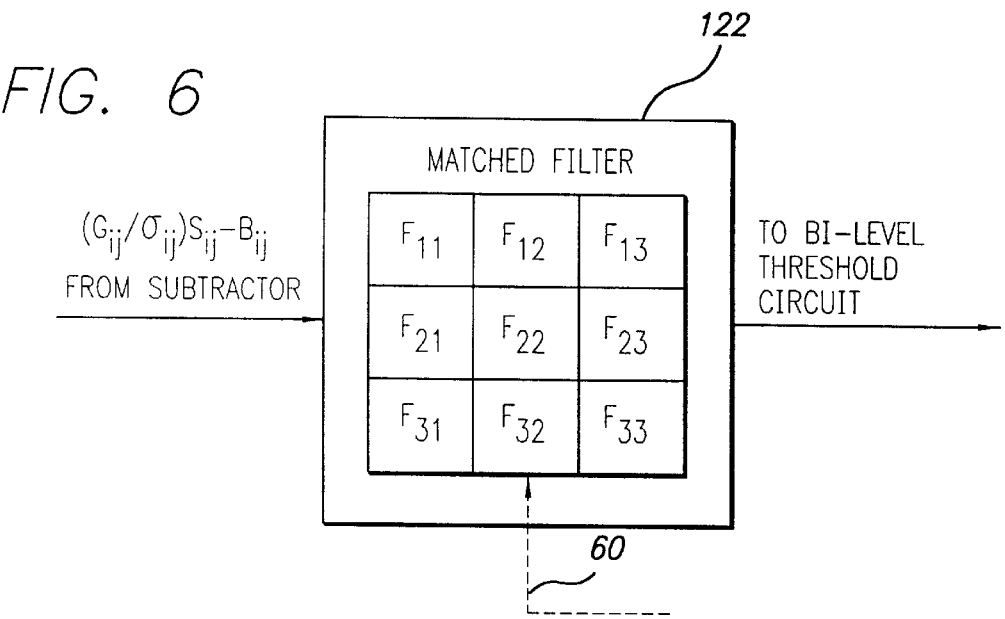
FIG. 6 is a diagram of a diagram of a finite impulse response (FIR) filter of the filter bank of FIG. 5.

FIG. 6 is a diagram of a finite impulse response (FIR) filter 122 of the filter bank 42 of FIG. 5. The FIR filter 122 is 3×'spatial FIR filter whose transfer function is convolved with frame data. The transfer functions, represented by the coefficients $f_{ij}$, are convolved with frame data and are designed to boost target SNR. Typically, the filter coefficients $f_{ij}$ are matched to a convolved optical point spread function (OPSF) of the sensor 22 of FIG. 1 for up to four different phasings of the OPSF on the ij detector of the sensor 22. The coefficients $f_{ij}$ are normalized to preserve total noise power of the zero-mean input signal from the frame integrator 34 of FIG. 1.

Those skilled in the art will appreciate that a filter kernel other than a 3×3 filter kernel such as a 5×5 or 7×7 filter kernel may be used for the FIR filter 122 without departing from the scope of the present invention.

With reference to FIGS. 1 and 6, the DSP 52 has software read/write access to the coefficients $f_{ij}$ and can change the coefficients $f_{ij}$ at the frame rate of the sensor 22. This facilitates matching of the filter coefficients $f_{ij}$ to the velocity of a point source target across the detector array of the sensor 22 via inputs from the IRU 58.

Figure 7:
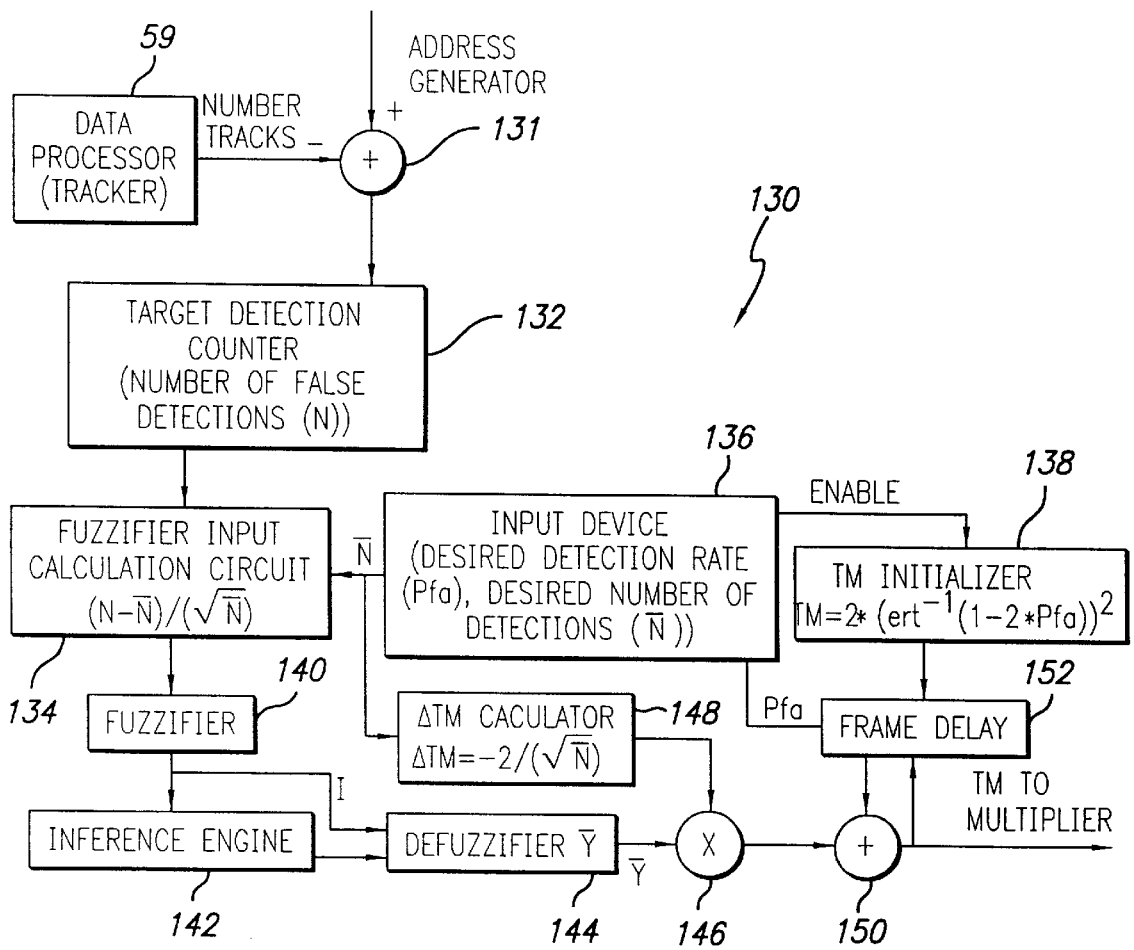
FIG. 7 is a diagram showing key functional blocks of a fuzzy threshold controller implemented in the digital signal processor of the target detection system of FIG. 1.

FIG. 7 is a diagram showing key functional blocks of a fuzzy threshold controller implemented in the digital signal processor 52 of the target detection system 20 of FIG. 1. The fuzzy threshold controller 130 includes a target detection counter 132 and a track subtractor 131, an input of which is connected to the address generator 46 of FIG. 1. An output of the target detection counter 132 is connected to one input of a fuzzifier input calculation circuit 134, another input of which is connected to a first output of an input device 136. Second and third outputs of the input device 136 are connected to a frame delay 152 and a threshold multiplier initializer 138. An output of the fuzzifier input calculation circuit 134 is input to a fuzzifier 140, the output of which is connected, in parallel to an inference engine 142 and to an input of a defuzzifier 144. An output of the inference engine 142 is connected to another input of the defuzzifier 144, the output of which is connected to an input of a fuzzy threshold controller multiplier 146. Another input of the fuzzy threshold controller multiplier 146 is connected to an output of a ΔTM calculator 148, the input of which is connected to the first output of the input device 136. The first output is also connected to an input of the fuzzifier input calculation circuit 134. An output of the fuzzy threshold controller multiplier 146 is connected to an input of a fuzzy threshold controller adder 150, another input of which is connected to a frame delay circuit 152. An input of the frame delay circuit 152 is connected to an output of the fuzzy threshold controller adder 150 and another input of the frame delay circuit 152 is connected to an output of the TM initializer 138.

In operation, the target detection counter 132 receives an input from the address generator 46 of FIG. 1 and outputs the number of alarms, i.e., the number of detections (N) received in an image frame to a fuzzifier input calculation circuit 134. The desired number of false detections may be adjusted in accordance with the performance requirements for a particular application. Those skilled in the art will appreciate that the target detection counter 132 may be designed to receive input directly from the bi-level threshold circuit 44 without departing from the scope of the present invention.

The input device 136, which may be implemented as a keypad, allows a user to input a desired number of detections ($\bar{N}$) to be received by the target detection counter 132 during a frame.

The fuzzifier input calculation circuit provides an input to the fuzzifier 140 that is computed in accordance with the following equation:

$$(N-\bar{N})/(\bar{N})^{1/2}, \quad [1]$$

where N is the number of detections in a frame and $\bar{N}$ is the desired number of detections in a frame.

The fuzzifier 140 computes a fit vector I={a1, a2, ..., am} in accordance with an input feature (as discussed more fully below). In the present specific embodiment, m is 7, which corresponds to the number of input regions of the input feature. Each $(N-\bar{N})/(\bar{N})^{1/2}$ value is mapped into a predetermined number of input regions, i.e., sets Ai, and each value is assigned a particular degree of fit in the associated input regions in accordance with the rules of the input feature. In the present specific embodiment, i ranges from 1 to 7 and is the number of input regions of the input feature. For example, a particular value for $(N-\bar{N})/(\bar{N})^{1/2}$ may cause the fuzzifier to activate first and second input regions of the input feature, and assign the input $(N-\bar{N})/(\bar{N})^{1/2}$ degrees of fit a1 and a2 corresponding to the first and second regions, respectively. This results in a fit vector of I={a1, a2, 0, 0, 0, 0, 0}.

The fuzzifier 140 maps continuous measurements (($N-\bar{N})/(\bar{N})^{1/2}$) into membership values in the input fuzzy sets Ai. Let the input measurement be the variable $x=(N-\bar{N})/(\bar{N})^{1/2}$ and let the domain of x be the interval $[x_a, x_b]$. The input space is spanned by the set {Ai} of input fuzzy sets Ai for i=1, 2, ..., m, where m is 7 in the present specific embodiment. A membership function $\mu_i(x)$ is associated with each fuzzy set Ai. The membership function $\mu_i(x)$ maps, via the fuzzifier 140, the input x into the degree of membership in Ai resulting in the input fuzzy vector I={a1, a2, ... am} where ai is the membership value of the input x in the ith fuzzy set Ai and can take on values in the interval [0, 1] in the present specific embodiment.

The fit vector I is input to the inference engine 142 The inference engine 142 maps elements of the fit vector I into output regions, i.e., sets Bj having centroids Cj and areas Rj, in accordance with rules of an output feature (as discussed more fully below). In the present specific embodiment, j ranges from 1 to 7, where 7 is the number of output regions of the output feature.

The inference engine 142 maps the input fuzzy sets Ai into the output fuzzy sets Bj in accordance with the rules of the output feature. In the present specific embodiment, the rules of the output feature are of the form if (A) then (B). The fuzzy threshold controller utilizes seven input fuzzy sets Ai and seven output fuzzy sets Bj, each set Ai and Bj having elements given the linguistic names LN, MN, SN, ZERO, SP, MP, LP which stand for large negative, medium negative, small negative, zero, small positive, medium positive, and large positive, respectively. The following table defines seven fuzzy rules implemented by the inference engine 142.

TABLE 1

| ( Ai; | Bj(i) ) |
|---|---|
| ( LN; | LP ) |
| ( MN; | MP ) |
| ( SN; | SP ) |
| (ZERO; | ZERO ) |
| ( SP; | SN ) |
| ( MP; | MN ) |
| ( LP; | LN ) |

The output fuzzy set Bj(i) is the jth output fuzzy set and is associated with the ith input fuzzy set Ai. The fuzzy rules are of the form (Ai;Bj(i)), which is interpreted as "If the input fuzzy set is Ai, then the output fuzzy set Bj(i) is activated". For example, if the input fuzzy set LP is activated, the inference engine 142 activates the output fuzzy set LN.

The defuzzifier 144 computes an output ($\bar{y}$) based on a linear combination of elements ai of the input fit vector I and the corresponding output regions having centroids Cj(i) and areas Rj(i). The output of the defuzzifier 144 is a weighted centroid computed in accordance with the following equation:

$$\bar{y} = \sum_{i=1}^{m} ai * Rj(i) * Cj(i) \Big/ \sum_{i=1}^{m} Rj(i), \quad [2]$$

The output $\bar{y}$ of the defuzzifier 144 is multiplied with a delta threshold multiplier ($\Delta$TM) via the multiplier 146. $\Delta$TM is computed in accordance with the following equation:

$$\Delta TM = -2/\sqrt[4]{\bar{N}}, \quad [3]$$

where $\bar{N}$ is the desired number of alarms in an image frame. The output of the multiplier 146 is $\bar{y}*\Delta$TM and is added to the output of the frame delay 152 via the adder 150. The output of the frame delay is either an initial threshold multiplier value provided by the TM initializer 138 or the output of the adder 150 delayed by one frame. The TM initializer is selectively activated via an enable connection from the input device 136. The TM initializer may be activated by user input via the input device 136 or may be activated by another means without departing from the scope of the present invention.

The TM initializer 138 computes the initial value TM in accordance with the following equation:

$$TM = 2*(erf^{-1}(1-2*Pfa))^2, \quad [4]$$

where Pfa is the desired probability of false alarms and is specified by a user via the input device 136 The output of the fuzzy threshold controller adder 150 represents the global threshold multiplier TM and is input to the third multiplier 50 of FIG. 1.

With reference to FIGS. 1 and 7, the global threshold multiplier TM controls the values of the thresholds $T1_{ij}$ for detectors in the detector array of the sensor 22 in the bi-level threshold circuit 44. The fuzzy threshold controller 130 may be implemented in software or hardware by those ordinarily skilled in the art. The fuzzy threshold controller 130 maintains a constant threshold exceedance rate, i.e., a constant probability of false alarm (Pfa) which may be specified by a user via the input device 136. The fuzzy threshold controller 130 monitors the number of alarms during a predetermined time interval and adjusts the threshold multiplier TM and thereby lowers threshold $T1_{ij}$ accordingly.

The input device 136 includes a memory device (not shown) that maintains a nominal value $\overline{N}$ for the desired number of detections per frame. The actual number of false detections N associated with a given frame is compared to the nominal value $\overline{N}$. The fuzzy threshold controller 130 incrementally changes the TM by an amount $\Delta$TNR based on the normalized deviation between the actual number of noisy detections N and the nominal value $\overline{N}$. i.e., $(N-\overline{N})/(\overline{N})^{1/2}$.

Additional fuzzy logic controllers (not shown) identical to the fuzzy logic controller 130 may be implemented to control the false alarm rate due to the presence of periodic noise spikes in the sensor frame data.

Figure 8:
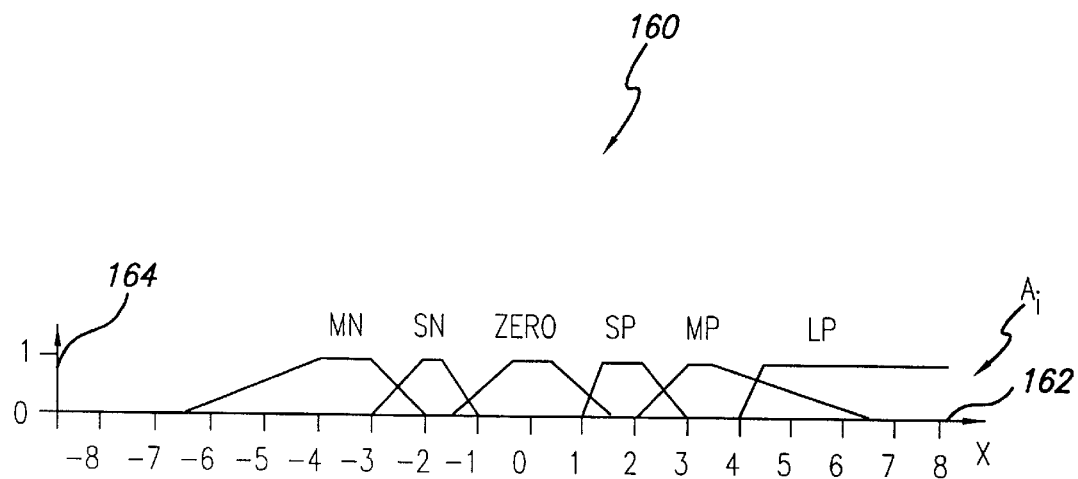
FIG. 8 is a graph of the input feature of the fuzzy threshold controller of FIG. 7.

FIG. 8 is a graph of the input feature 160 of the fuzzy threshold controller 130 of FIG. 7. The input feature 160 includes seven sets Ai corresponding to the regions labeled MN, SN, ZERO, SP, MP and LP. A horizontal axis 162 represents the input $x=(N-\overline{N})/(\overline{N})^{1/2}$. A vertical axis 164 represents degrees of fit. For example, if the input is approximately 5, the MP region and the LP regions are activated. The MT region is activated with a degree of fit of approximately ½ and the LP region is activated with a degree of fit of 1. The fit vector I={a1, ... am} will contain the elements ½ and 1. The corresponding output fuzzy sets Bj(i), i.e., the sets MN and LN of the output feature will be activated in accordance with the fuzzy rules depicted in Table 1 and as discussed more fully below.

Figure 9:
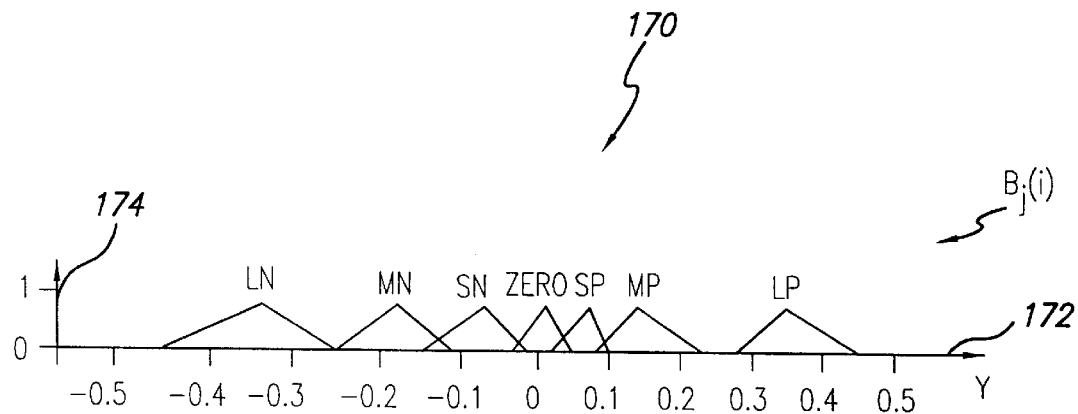
FIG. 9 is a graph of the output feature of the fuzzy threshold controller of FIG. 7.

FIG. 9 is a graph of the output feature 170 of the fuzzy threshold controller 130 of FIG. 7. The output feature 170 includes seven sets Bj(i) corresponding to the regions labeled LN, MN, SN, ZERO, SP, MP, and LP. An output feature horizontal axis 172 represents y values internal to the inference engine 142. An output feature vertical axis 174 represents a degree of membership in each of the output regions LN, MN, SN, ZERO, SP, MP, and LP.

With reference to FIGS. 7, 8, and 9 if $(N-\overline{N})/(\overline{N})^{1/2}$ is large, for example 8, the number of detections N is much larger than the desired number of detections $\overline{N}$. The LP region of the input feature 160 is activated. The inference engine 142 then activates the LN output region. With reference to equation (2), because absolute values of the centroid Cj(i) and corresponding area Rj(i) of the LN output region are relatively large, the output $\overline{y}$ of the defuzzifier 144 will be a relatively large negative value due to the negative centroid value Cj(i). The output of the multiplier 146 will be a relatively large positive value after multiplication by $\Delta$TM, which is negative. When the output of the multiplier 146 is added to the previous TM via the adder 150, the output of the adder 150 will yield an appropriate increase in the TM. The resulting higher threshold level will result in a reduction of the number of detections N and hence, $(N-\overline{N})/(\overline{N})^{1/2}$ will be become smaller In this way, the fuzzy controller 130 of FIG. 7 facilitates the maintenance of an approximately constant probability of false alarms in a particular frame in accordance with the desired number of alarms $\overline{N}$.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A fuzzy controller for facilitating the calculation of a false alarm rate detection threshold in a constant false alarm rate target detection system comprising:

first means for mapping an input into a first set of values defined by an input feature, said input a function of a number of alarms received during a predetermined time interval by said target detection system in response to a pre-existing false alarm rate detection threshold, and a number of desired alarms;

second means for establishing a set of fuzzy regions based on said first set of values in accordance with an output feature; and third means for calculating a desired change in said pre-existing false alarm rate detection threshold based on a weighted sum centroids and areas of said regions and providing said false alarm rate detection threshold in response thereto.

2. The invention of claim 1 wherein said sum of said centroids and areas is weighted by said third means via said first set of values.

3. A fuzzy controller for use in target detection systems comprising:

first means for determining a number of false alarms in a frame of data;

second means for determining a desired number of false alarms for said frame of data; and third means for computing a threshold multiplier factor based on said number of false alarms, said desired number of false alarms, and one or more fuzzy rules.

4. The controller of claim 3 wherein said first means includes a target detection system for providing pixel addresses of pixels whose values are within a predetermined range relative to a threshold.

5. The controller of claim 4 wherein said second means includes an input device for accepting said desired number of false alarms as input to said fuzzy controller.

6. The controller of claim 5 wherein said third means includes a fuzzifier input calculation circuit that computes a value defined by the following equation:

$$(N-\overline{N})/\left(\sqrt{\overline{N}}\right),$$

where N is said number of false alarms, and $\overline{N}$ is said desired number of false alarms.

7. The controller of claim 6 wherein said third means further includes a fuzzifier for mapping said value into one or more membership values ($a_i$) associated with one or more input fuzzy sets (Ai) in accordance with a membership function ($\mu_i(x)$) and providing an input fit vector (I) in response thereto.

8. The controller of claim 7 wherein said third means further includes an inference engine for mapping said membership values ($a_i$) of said input fit vector (I) into one or more corresponding output fuzzy sets (Bj(i)) in accordance with rules of an output feature.

9. The controller of claim 8 wherein said third means further includes a defuzzifier for computing a weighted centroid ($\bar{y}$) in accordance with the following equation:

$$\bar{y} = \sum_{i=1}^{m} a_i * Rj(i) * Cj(i) \Big/ \sum_{i=1}^{m} Rj(i),$$

where $a_i$ is the $i^{th}$ input membership value of said input fit vector (I); Rj(i) is an area of a $j^{th}$ output fuzzy set (Bj(i)) associated with the $i^{th}$ input fuzzy set (Ai); Cj(i) is a centroid associated with said $j^{th}$ output fuzzy set (Bj(i)); and m is the length of said input fit vector (I).

10. The controller of claim 9 wherein said third means further includes means for computing said threshold multiplier factor (TM) based on said weighted centroid, a delta threshold multiplier value and a desired probability of false alarms, an initial threshold multiplier value ($TM_0$)), and/or a delayed version of said threshold multiplier factor (TM).

11. The controller of claim 10 wherein said initial threshold multiplier value ($TM^0$) is given by the following equation:

$$TM_0 = 2(erf^{-1}(1-2*Pfa))^2,$$

where Pfa is a desired probability of false alarms as provided by said input device.

* * * * *